(12) United States Patent
Kato

(10) Patent No.: US 7,088,951 B2
(45) Date of Patent: Aug. 8, 2006

(54) RECEIVER, METHOD THEREOF, PROGRAM THEREOF, RECORDING MEDIUM RECORDING THE PROGRAM, AND COMMUNICATION SYSTEM

(75) Inventor: Sei Kato, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 621 days.

(21) Appl. No.: 10/443,894

(22) Filed: May 23, 2003

(65) Prior Publication Data

US 2003/0224724 A1   Dec. 4, 2003

(30) Foreign Application Priority Data

May 29, 2002   (JP)   ............................ 2002-155978

(51) Int. Cl.
  *H04H 1/00*   (2006.01)
(52) U.S. Cl. ...................... 455/3.02; 455/12.1; 455/17; 455/150.1; 455/226.1; 455/227; 370/316; 370/147; 375/150
(58) Field of Classification Search .............. 455/3.02, 455/3.01, 12.1, 17, 13.1, 22, 13.3, 227, 13.4, 455/296, 226.1, 23, 130, 131, 132, 137, 150.1, 455/151.4, 894, 297; 370/316; 375/147, 375/150

See application file for complete search history.

(56) References Cited

U.S. PATENT DOCUMENTS

| | | | |
|---|---|---|---|
| 5,841,765 A * | 11/1998 | Fielding et al. | ............. 370/319 |
| 2002/0021886 A1* | 2/2002 | Nakajima et al. | ............. 386/46 |
| 2002/0106987 A1* | 8/2002 | Linden | ...................... 455/12.1 |

\* cited by examiner

*Primary Examiner*—Nay Maung
*Assistant Examiner*—Shaima Q. Arminzay
(74) *Attorney, Agent, or Firm*—Armstrong, Kratz, Quintos, Hanson & Brooks LLP

(57) ABSTRACT

The system controller 12 attains program table data from a received electric wave upon turning on the power source. Program table data are rearranged for every ensemble and stored again. The user makes an input operation to set a channel-feed selection which requires switching of a program to be attained. Then, the system controller 12 performs a processing of attaining a program listed next in the same ensemble as that of the program which has been attained just before based on the rearranged program table data. When attaining a program next to a program listed in the last, the ensemble is switched to another ensemble. Programs are attained sequentially from the program listed first in the another ensemble thus switched. Switching to a different ensemble takes place at a reduced frequency, so that the time until output of an attained program can be shortened.

15 Claims, 11 Drawing Sheets

FIG. 5

| CH | ENSEMBLE | CATEGORY |
|---|---|---|
| 1 | A | PREVIEW CHANNEL (FREE CH) |
| 2 | A | ROCK |
| 3 | B | ROCK |
| 4 | A | ROCK |
| 5 | A | ROCK |
| 6 | B | ROCK |
| 7 | A | JAZZ |
| 8 | A | JAZZ |
| 9 | B | JAZZ |
| 10 | A | POPS |
| ⋮ | ⋮ | ⋮ |

FIG.6

| CH | ENSEMBLE | CATEGORY |
|---|---|---|
| 1 | A | PREVIEW CHANNEL (FREE CH) |
| 2 | A | ROCK |
| 4 | A | ROCK |
| 5 | A | ROCK |
| 7 | A | JAZZ |
| 8 | A | JAZZ |
| 10 | A | POPS |
| 3 | B | ROCK |
| 6 | B | ROCK |
| 9 | B | JAZZ |
| ⋮ | ⋮ | ⋮ |

| CH | 2 | 4 | 5 | 7 | 8 | 10 | 3 | 6 | 9 | 1 |
|---|---|---|---|---|---|---|---|---|---|---|
| TIME UNTIL AUDIO OUTPUT | (2S) | 2S | 2S | 2S | 2S | 2S | 6S | 2S | 2S | 6S |

FIG.10

| CH | ENSEMBLE | CATEGORY |
|---|---|---|
| 1 | A | PREVIEW CHANNEL (FREE CH) |
| 2 | A | ROCK |
| 4 | A | ROCK |
| 5 | A | ROCK |
| 3 | B | ROCK |
| 6 | B | ROCK |
| 7 | A | JAZZ |
| 8 | A | JAZZ |
| 9 | B | JAZZ |
| 10 | A | POPS |
| ⋮ | ⋮ | ⋮ |

FIG. 11
FIG. 12
| CH | 2 | 4 | 5 | 3 | 6 |
|---|---|---|---|---|---|
| TIME UNTIL AUDIO OUTPUT | -(2S) | 2S | 2S | 6S | 2S |
FIG. 13

| CH | 2 | 3 | 4 | 5 | 6 | 7 | 8 | 9 | 10 | 1 |
|---|---|---|---|---|---|---|---|---|---|---|
| TIME UNTIL AUDIO OUTPUT | - (2S) | 6S | 6S | 2S | 6S | 6S | 2S | 6S | 6S | 2S |

RECEIVER, METHOD THEREOF, PROGRAM THEREOF, RECORDING MEDIUM RECORDING THE PROGRAM, AND COMMUNICATION SYSTEM

BACKGROUND OF THE INVENTION

1. Field of the Invention

The present invention relates to a receiver, method thereof, program thereof, recording medium recording the program, and communication system, which receive plural sets of data into which plural different data items are divided, in the form of electric waves having different frequency bands, from a ground station and plural artificial satellites, appropriately demodulate the sets of data, to obtain predetermined sets of data and plural data items included in the sets of data.

2. Description of Related Art

Conventionally known digital broadcasting which provides a large number of music programs is, for example, a digital broadcasting system constructed by XM SATELLITE RADIO COMPANY, i.e., so-called XM digital broadcasting. In the XM digital broadcasting, total 100 programs to be provided are divided into two sets each including 50 programs to reduce loads to outputs of electric waves and to reduce loads to programs to be obtained. Also, in the XM digital broadcasting, ground stations each settled on the ground and two artificial satellites output electric waves in respectively different frequency bands between the two sets each including 50 programs. The total 100 programs are thus provided.

That is, in the XM digital broadcasting, electric waves are outputted from the ground stations and artificial satellites so that the programs can be received in not only city areas but also suburbs. Also, in the XM digital broadcasting, the electric waves of different frequency bands which respectively differ between the sets each including 50 programs are outputted from each of the two artificial satellites, so that even a moving object which is moving like a vehicle can receive the programs. This is because the electric waves from one artificial satellite can be securely received even if the electric waves from the other satellite come to be not received due to movement of a moving object. Thus, in the XM digital broadcasting, the electric waves in different frequency bands which differ respectively between the sets of programs are outputted from each of two artificial satellites and one ground station. Electric waves in total 6 kinds of frequency band are used.

Also, the XM digital broadcasting adopts a structure in which electric waves of three kinds of the set including a desired program to be obtained are received, among the outputted electric waves of the total six kinds of frequency band, in order to obtain the desired program. To switch the program to be obtained to another program, for example, there is a method of directly selecting another program by operating a button. There may be another method of, for example, as shown in FIG. 14, selecting another program by continuously changing programs until a favorite program is found out, in consideration of the large number of programs provided. Alternatively, there is another method of sequentially outputting programs each for a predetermined time period until the same genre as that immediately before starting switching the program is selected.

When a program which has been being obtained is switched to another program, there is a case that the another program belongs to the other set of programs than the set of programs to which the foregoing program belongs. In this case, it is necessary to receive electric waves of the other three kinds of frequency band, which correspond to the other set of programs. Further, electric waves are received with a time delay for four seconds or so maintained between the two artificial satellites, due to the positional relationship between the artificial satellites and the like. That is, there is a time interleaf between the two artificial satellites. Suppose hence that programs are switched by shifting programs forwardly as shown in FIG. 14, in case of a program configuration as shown in FIG. 5, for example. As shown in FIG. 15, two seconds or so are required until another program in the same set is outputted. However, six seconds or so are required if a program is switched to another program in the other set and if only one electric wave can be received from satellites. Therefore, every time when a program is switched to another program in a different set of programs, a long time is required before the another program is outputted. Utility is thus not improved.

It may be possible to eliminate the drawback of the time interleaf by attaining all of the electric waves of the six kinds of frequency bands equivalent to the two sets of programs. In such a structure, the number of programs increases several times, enhancing the data amount outputted in the form of electric waves. Consequently, processing loads are increased so that the size and power consumption of the device may increase.

SUMMARY OF THE INVENTION

In consideration of the problems described above, the present invention relates to a receiver with a simple structure, which is capable of easily preventing deterioration of utility due to time interleaves, a method thereof, a program thereof, a recording medium which records the program, and a communication system.

A receiver according to the present invention receives plural aggregates of data in different frequency bands, respectively, from a ground station and plural artificial satellites, in the form of electric waves together with a list of plural different data items which are grouped into the aggregates of data, demodulates the received electric waves to attain predetermined one of the aggregates of data, and attains the data items included in the predetermined one of the aggregate of data. The receiver comprises: a recording portion which creates a record list based on the list; an input portion which sets and inputs a data switching request for sequentially switching the attained data items, in an order of the data items listed in the record list, by an input operation; and a control portion which recognizes an input of setting the data switching request by the input portion, and accordingly makes a control of attaining the closest one of the data items to one of the data items which has been attained immediately before the input of setting the data switching request, in the order of the data items listed in the record list, the closet one data item included in the same aggregate of data as one of the aggregates of data which has been attained before the input of setting the data switching request.

According to the invention described above, the input portion sets and inputs a data switching request for sequentially switching the attained data items, in an order of the data items listed in the record list, by an input operation. When the control portion recognizes an input of setting the data switching request by the input portion, the closest one of the data items to one of the data items which has been attained immediately before the input of setting the data switching request, in the order of the data items listed in the record list, and which is included in the same aggregate of data as one of the aggregates of data which has been attained before the input of setting the data switching request is attained. As a result, in switching to another data item, switching to a different aggregate of data takes place less frequently. Therefore, the time lag in attaining data, which is caused by a time interleaf between electric waves outputted from plural artificial satellites, can be shortened, so that utility is improved.

Preferably in the receiver according to the present invention, if there is no next data item in the same aggregate of data as the aggregate of data including the one of the data items which has been attained immediately before, when the input of setting the data switching request is recognized by the input portion, the control portion makes a control of attaining one of the data items, which is included in another one of the aggregates of data and is listed first in the record list or closest in the order to the one of the data items which has been attained immediately before.

According to this structure, if the input of setting the data switching request is recognized and there is no next data item in the same aggregate of data as the aggregate of data including the one of the data items which has been attained immediately before, the control portion makes a control of attaining one of the data items, which is included in another one of the aggregates of data and is listed first in the record list or closest in the order to the one of the data items which has been attained immediately before. As a result, even data items which are listed in the record list and belong to a different aggregate of data can be attained sequentially only by setting a data switching request via the input portion, with a reduced frequency at which switching takes place between different aggregates of data.

Also preferably in the receiver according to the present invention, if there is no next data item in the same aggregate of data as the aggregate of data including the one of the data items which has been attained immediately before, when the input of setting the data switching request is recognized by the input portion, the control portion makes a control of attaining one of the data items, which is included in the same aggregate of data as the one of the data items, which has been attained immediately before, and is listed first in the record list or closest in the order to the one of the data items which has been attained immediately before.

According to this structure, if the input of setting the data switching request is recognized and there is no next data item in the same aggregate of data as the aggregate of data including the one of the data items which has been attained immediately before, the control portion makes a control of attaining one of the data items, which is included in the same aggregate of data as the one of the data items, which has been attained immediately before, and is listed first in the record list or closest in the order to the one of the data items which has been attained immediately before. As a result, even data items which are listed in the record list and belong to a different aggregate of data can be attained sequentially only by setting a data switching request via the input portion, with a reduced frequency at which switching takes place between different aggregates of data. Since data items are attained sequentially in the same aggregate of data, drawbacks due to a time interleaf caused by switching to a different aggregate of data can be prevented, so that data can be attained within a shorter time period.

Also preferably in the receiver according to the present invention, the input portion is capable of making an input of setting a category of one of the data items to be attained, and the input portion recognizes the input of setting the category, and accordingly makes a control of attaining one of the data items in the same category as that of one of the data items which has been attained immediately before, upon recognition of the data switching request. According to this structure, if an input of setting a category of a data item is recognized by the input portion, the control portion makes a control of attaining within one of the data items in the same category as that of one of the data items which has been attained immediately before, when attaining a next data item upon recognition of the data switching request. As a result, a favorite data item of the user can be attained, preventing drawbacks due to a time interleaf caused by switching to a different aggregate of data.

Also preferably in the receiver according to the present invention, the input portion is capable of making an input of setting one of the data items to be attained, by an input operation, and the control portion makes a control of attaining the one of the data items which is set by the input operation.

In this structure, the control portion makes a control of attaining a data item which is set by the input operation. As a result, a data item to be attained can be directly attained in addition to the structure of attaining sequentially data items. Utility can thus be enhanced.

Also preferably in the present invention, the artificial satellites are two, and the aggregates of data are two.

This structure is suitable for a case of using two artificial satellites and attaining one of two aggregates of data.

In a receiving method according to the present invention, plural aggregates of data are respectively received in different frequency bands, from a ground station and plural artificial satellites, in the form of electric waves together with a list of plural different data items which are grouped into the aggregates of data, the received electric waves are demodulated to attain predetermined one of the aggregates of data, and the data items included in the predetermined one of the aggregate of data are attained. The receiving method comprises: creating and recording a record list based on the list; and attaining, if a data switching request for sequentially switching the attained data items in an order of the data items listed in the record list is recognized, the closest one of the data items to one of the data items which has been attained immediately before input of setting the data switching request, in the order of the data items listed in the record list, the closet one data item included in the same aggregate of data as one of the aggregates of data which has been attained before the input of setting the data switching request.

As a result, the same functions and advantages as those of the receiver according to the present invention described above can be attained.

In a receiving method according to the present invention, the foregoing developments in structure of the receiver according to the present invention can also be applied to the receiving method according to the present invention. As a result, the same functions and advantages as those of the receiver according to the present invention described above can also be attained.

A receiving program according to the present invention makes a calculator portion to execute the receiving method described above.

According to this invention, for example, a general-purpose computer is used as the calculator portion and the program is installed in the computer. As a result, the receiving method according to the present invention described above can be executed by the calculator portion, so that use of the present invention can be greatly promoted. A recording medium according to the present invention records the receiving program according to the present invention described above, such that the receiving program is readable by the calculator portion.

In this invention, the receiving program according to the present invention described above is recorded on a recording medium. Therefore, the receiving program can be handled easily, so that use of the present invention can be promoted greatly.

In the receiving program and recording medium according to the present invention, the calculator portion is defined by including a personal computer, a structure in which plural computers are combined on a network, an element such as an IC or CPU in a microcomputer or the like, and a circuit board on which plural electric components are mounted.

A communication system according to the present invention comprises: a ground station and plural artificial satellites each of which outputs plural aggregates of data different frequency bands in respectively, in the form of demodulated electric waves; plural artificial satellites each of which respectively outputs plural aggregates of data different frequency bands in respectively, in the form of demodulated electric waves; and the receiver according to the present invention described above.

This invention uses the receiver according to any one of claims 1 to 6 which shortens the time lag in attaining data, which is caused by a time interleaf between electric waves outputted from plural artificial satellites so that utility is improved. It is therefore possible to make an excellent communication which provides good utility in steadily attaining plural data items included in aggregates of data regardless of environments in areas where the present invention is used.

BRIEF DESCRIPTION OF THE DRAWINGS

FIG. 5 is an explanatory table showing a data configuration of program table data attained by the receiver according to the embodiment;

FIG. 6 is an explanatory table showing a data configuration of program table data in which data items are rearranged for every ensemble in the receiver according to the embodiment;

FIG. 10 is an explanatory table showing a data configuration of program table data attained by the receiver according to the embodiment;

FIG. 11 is an explanatory view showing an operation of attaining programs in the receiver according to the embodiment;

FIG. 12 is an explanatory table showing an operation of attaining programs in the receiver according to the embodiment;

FIG. 13 is an explanatory view showing an operation of attaining programs in the receiver according to another embodiment of the present invention;

DETAILED DESCRIPTION OF THE PREFERRED EMBODIMENT(S)

Hereinafter, embodiments of a communication system according to the present invention will be described with reference to the drawings.

[Structure of Communication System]

Figure 1:
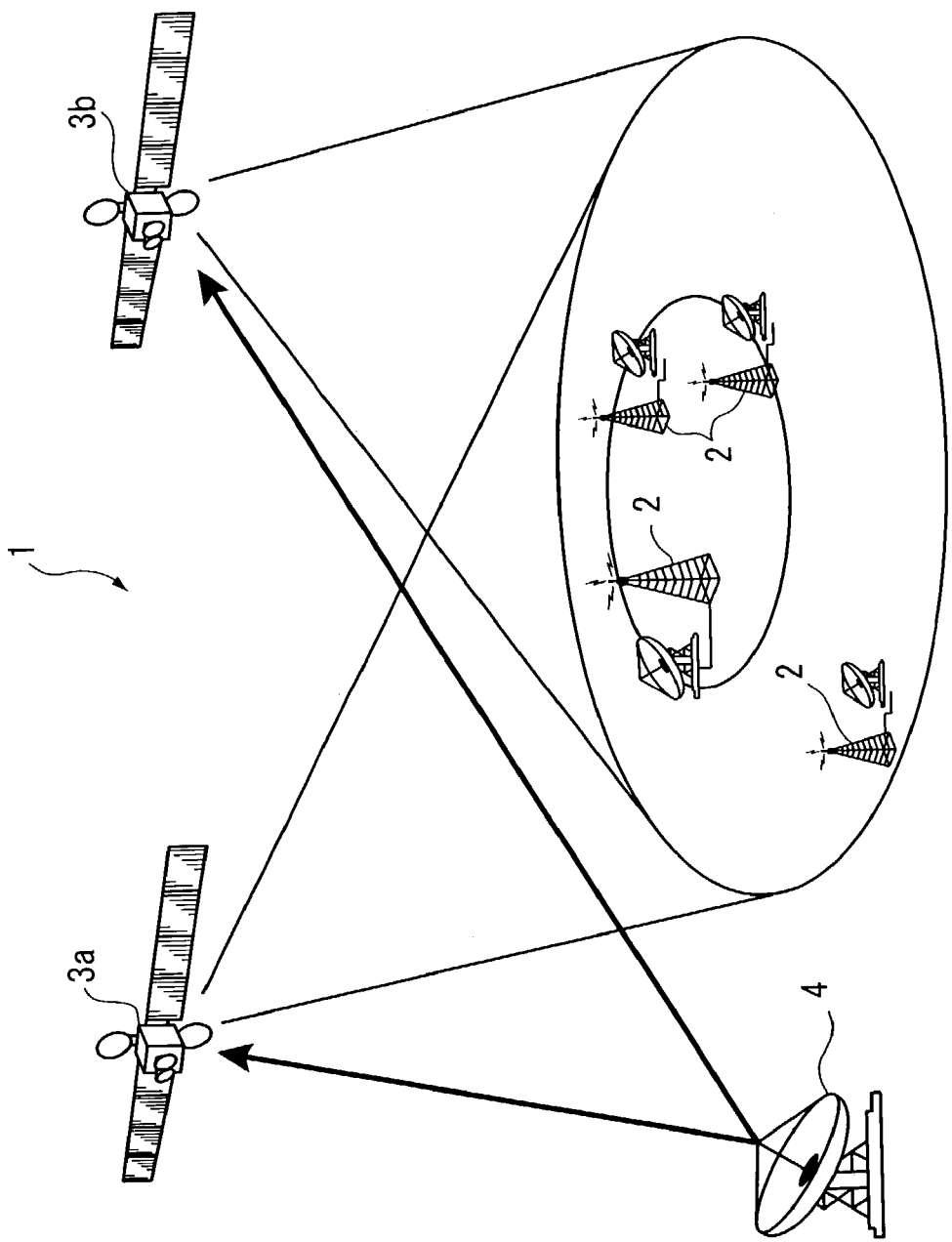
FIG. 1 is a conceptual view showing a brief structure of a communication system according to an embodiment of the present invention.
Figure 2:
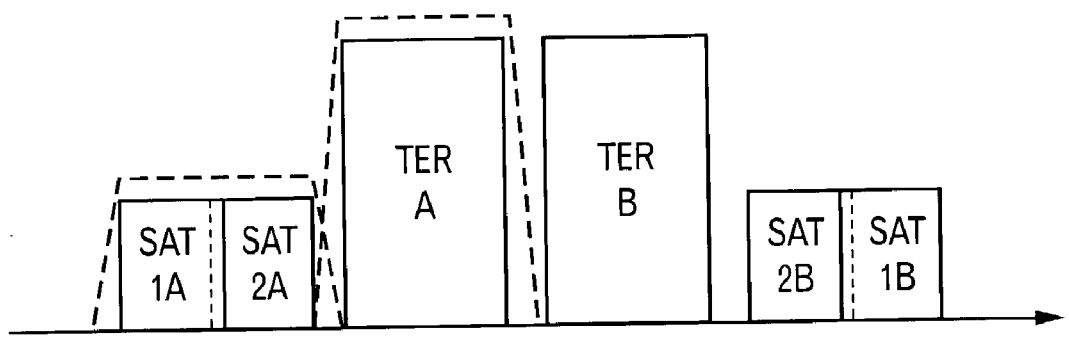
FIG. 2 is a conceptual view showing states of electric waves transmitted/received by the communication system according to the embodiment of the present invention.

FIG. 1 is a schematic view showing the brief structure of an embodiment of a communication system according to the present invention. FIG. 2 is a conceptual view showing states of electric waves transmitted/received in the communication system.

In FIG. 1, the reference numeral 1 denotes a communication system. In the communication system 1, plural data items such as music programs and news programs are provided over a wide area and are received and appreciated by terminals. The communication system 1 includes a ground station 2, plural, for example, two artificial satellites 3a and 3b, and a receiver as a terminal which will be described later.

The ground station 2 attains electric waves outputted from a base station 4 via the artificial satellites 3a and 3b. Further, the ground station 2 performs appropriate processing such as amplification, conversion, and the like on the attained electric waves, and outputs them in plural waves, for instance, in the form of ground waves in predetermined frequency bands TerA and TerB, as shown in FIG. 2. That is, plural programs such as music programs and news programs are provided in respectively different frequency bands at predetermined frequency intervals. If a hundred of programs or more are provided, the entire frequency bands are therefore so wide that a heavy load is applied to transmission/reception of programs. Hence, the plural programs are divided into two so-called ensembles A and B each of which consists of, for example, fifty programs. The ensembles A and B are outputted as ground waves having respectively different frequency bands.

The respective artificial satellites 3a and 3b attain electric waves outputted from the base station 4 and perform appropriate processing on the waves. As shown in FIG. 2, the satellites output the electric waves as satellite waves in plural frequency bands Sat1A and Sat1B as well as Sat2A and Sat2B, for example, in two kinds of frequency band. To be specific, like the case of the foregoing ground waves, the artificial satellite 3a outputs electric waves in frequency bands Sat1A and Sat1B of two kinds corresponding to ensembles A and B, as well as the artificial satellite 3b in frequency bands Sat2A and Sat2B.

[Structure of Receiver]

Figure 3:
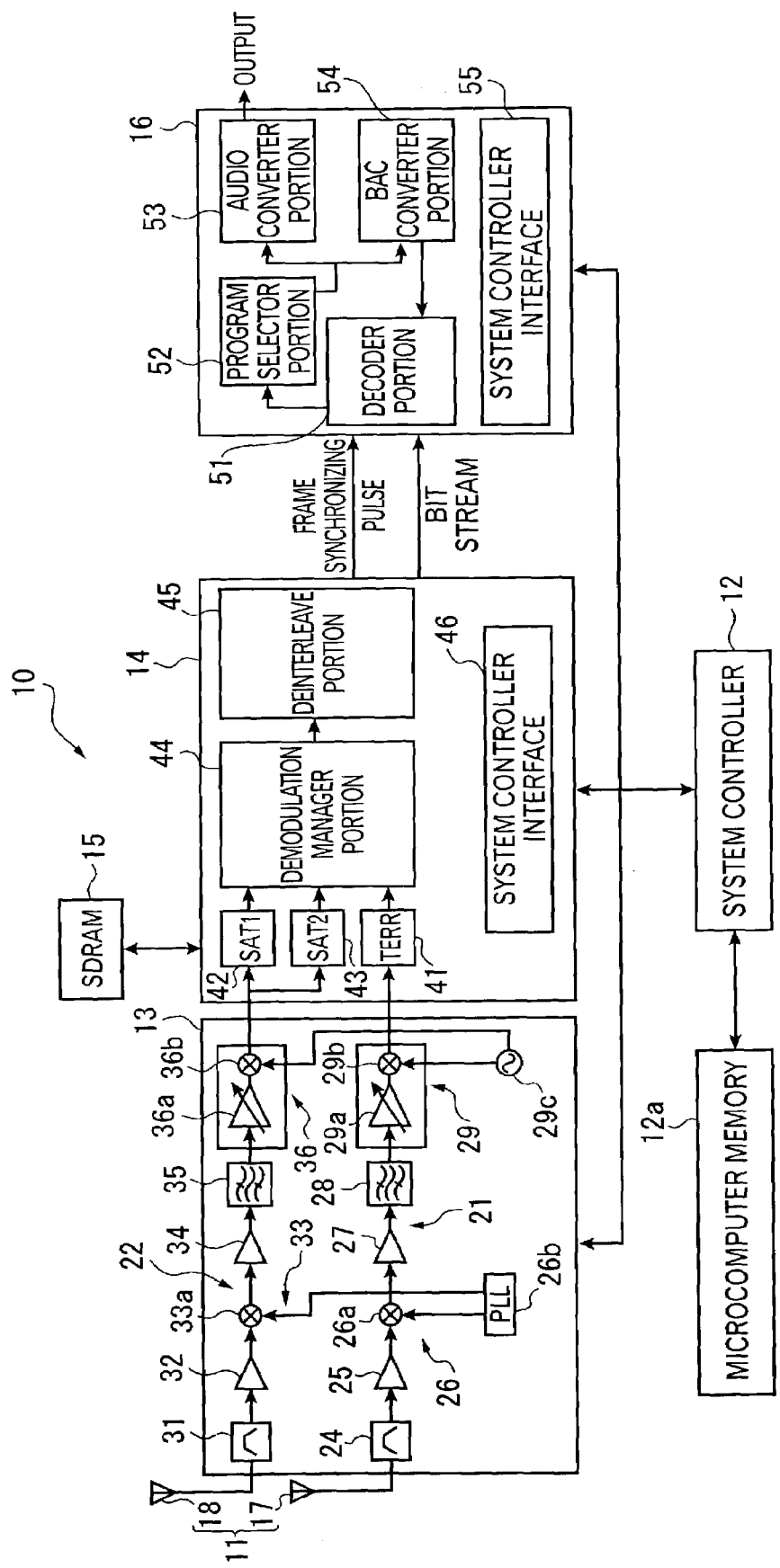
FIG. 3 is a block diagram showing a brief structure of a receiver according to the embodiment.
Figure 4:
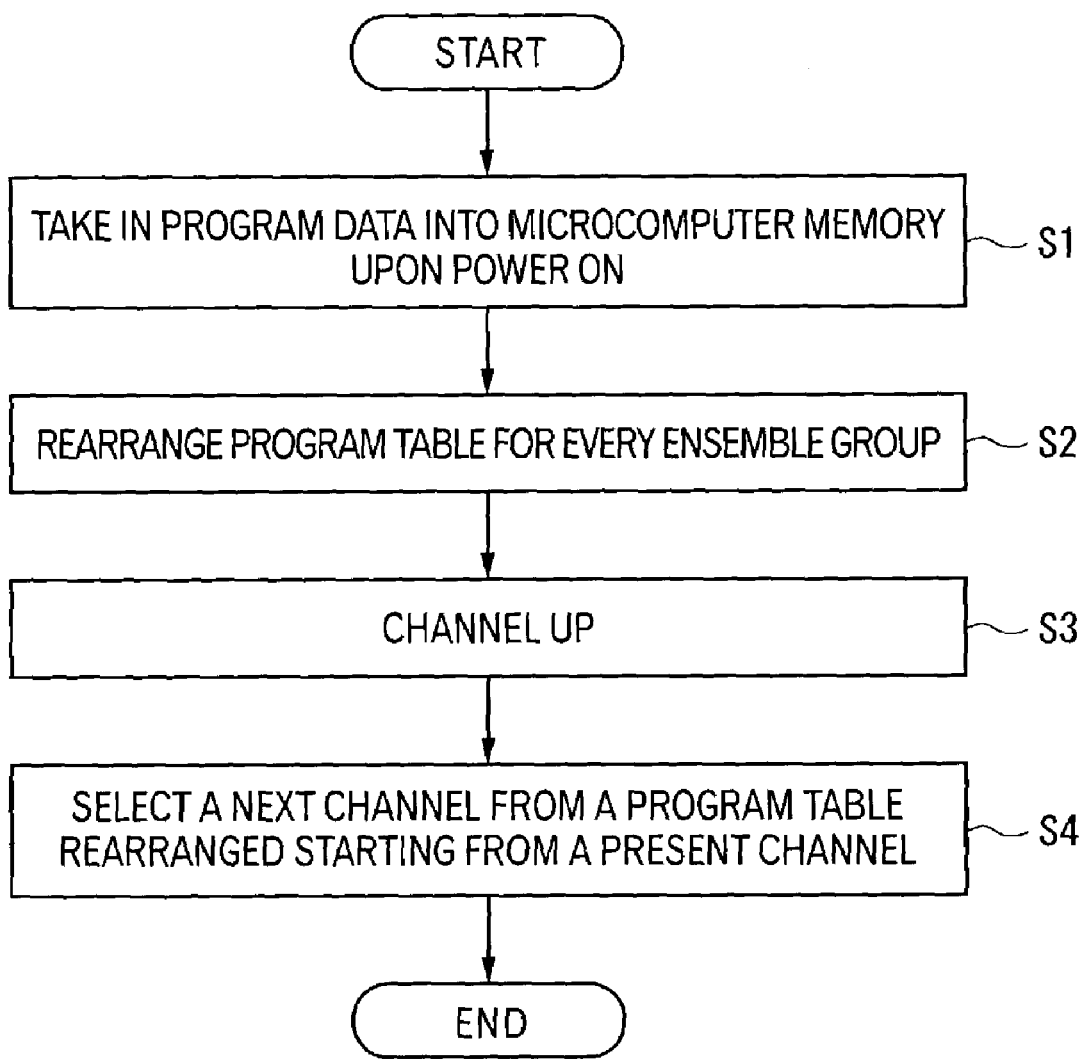
FIG. 4 is a flowchart showing an operation of attaining a program in a channel-feed selection manner in the receiver according to the embodiment.

The structure of a receiver will now be described with reference to the drawings. FIG. 3 is a block diagram showing a receiver in the present embodiment. FIG. 4 is a flowchart explaining a processing operation performed on electric waves received by the receiver.

In FIG. 3, the reference symbol 10 denotes the receiver which is used, for example, mounted on a vehicle such as a motorcar or the like as a moving body (not shown). Further, the receiver 10 has a receiving antenna 11, an input portion not shown, a system controller 12 as a control portion, a RF tuner 13, a channel decoder 14, a storage such as a SDRAM (Synchronous Dynamic Random Access Memory) 15, and a source decoder 16.

A receiving antenna 11 has a ground wave antenna 17 which receives ground waves, and a satellite wave antenna 18 which receives satellite waves.

The input portion has keys and switches that are not shown but are inputted and operated by a user, for example. Further, the input portion outputs predetermined signals corresponding to input operations on the keys and switches, to the system controller 12. In this manner, for example, the operation of the entire receiver 10 is set, e.g., an input of setting a predetermined program as a viewing target which the user intends to attain. The input of setting with use of an input portion is not limited to input operations via keys and switches but may be any method, e.g., an input of setting may be made via voice inputs.

The system controller 12 controls the operation of the entire receiver 10. Also, the system controller 12 outputs attained data, to an output device not shown but connected to the receiver 10, and makes the output device output the data in the form of voice or images, for example. Further, the system controller 12 is provided with a microcomputer memory 12a as a storage portion. The microcomputer memory 12a is used for a deinterleave processing which will be described later. That is, program table data is stored as a record list based on a list of programs, which is received data.

The RF tuner 13 has a ground wave tuner 21 and a satellite wave tuner 22. The ground wave tuner 21 is connected to the ground wave antenna 17. Also, the satellite wave tuner 22 is connected to the satellite wave antenna 18.

Further, the ground wave tuner 21 has an XM-band pass filter 24, a first ground wave amplifier circuit 25, a first ground wave frequency converter circuit 26, a second ground wave amplifier circuit 27, a second ground wave filter 28, and a ground wave automatic gain control circuit 29.

The XM-band pass filter 24 is connected to the ground wave antenna 17. This XM-band pass filter 24 performs a processing of damping signals having frequencies out of a predetermined frequency band, from signals of electric waves received by the ground wave antenna 17. For example, in case of receiving the XM digital broadcasting of the digital broadcasting system constructed by the XM satellite radio company, a processing of damping signals out of the XM-band of the XM digital broadcasting is performed.

The first ground wave amplifier circuit 25 is connected to the XM-band passfilter 24. Used as the first ground wave amplifier circuit 25 is a high-frequency amplifier transistor which constructs a LNA (Low Noise Amplifier) as an amplifier, e.g., a field effect transistor (Field Effect Transistor: FET). Particularly, a dual gate oxide metal semiconductor field-effect transistor (MOS (Metal Oxide Semiconductor) FET) is used as the FET. Further, the first ground wave amplifier circuit 25 outputs the signal subjected to the damping processing by the XM-band pass filter 24, as a high-frequency output signal from a drain.

The first ground wave frequency converter circuit 26 converts the signal amplified by the first ground wave amplifier circuit 25, into a predetermined middle-frequency signal. The first ground wave frequency converter circuit 26 has a first ground wave mixing circuit 26a and a first local oscillator circuit (PLL) 26b.

The first ground wave mixing circuit 26a efficiently converts the high-frequency signal outputted from the first ground wave amplifier circuit 25 into a middle-frequency signal, to reduce noise. For example, a PLL (Phase-Locked Loop) circuit is used as the first local oscillator circuit 26b. The PLL circuit has a phase detector (not shown) as its basic element, and compares the frequency of a voltage control oscillator not shown, with the frequency of an input carrier wave signal or that of a reference frequency generator. An output from the phase detector passes through a loop filter, and is then fed back to the voltage control oscillator, to make a control such that the phase of the input or reference frequency and the output are matched with each other precisely.

That is, the first ground wave mixing circuit 26a is controlled by appropriately switching two different middle frequencies such that the middle-frequency is constant. Specifically, the user makes an operation of inputting an ensemble A or ensemble B, and then, the system controller 12 recognizes a predetermined signal from the input portion. Further, the system controller 12 switches and controls the PLL circuit 26a so as to perform processing into predetermined middle-frequencies corresponding to the set and inputted ensembles A and B.

Used as the second ground wave amplifier circuit 27 is a high-frequency amplifier transistor which constitutes a LNA as an amplifier, e.g., a FET. Further, the second ground wave amplifier circuit 27 outputs a signal processed by the first ground wave converter circuit 26, as a high-frequency output signal from the drain.

As the second ground wave filter 28, for example, a surface acoustic wave (SAW) filter is used. The second ground wave filter 28 performs a processing of damping signals having frequencies out of the frequency band corresponding to the one of the ensembles A and B that has been set by the input portion. That is, the second ground wave filter 28 attains either the ensemble A in the frequency band TerA or the ensemble B in the frequency band TerB. The frequency band TerA or TerB subjected to the damping processing by the second ground wave filter 28 is set by the system controller 12 in correspondence with the ensemble A or B set by the input portion.

The ground wave automatic gain control circuit 29 amplifies the signal attained by the second ground wave filter 28, to a predetermined middle-frequency signal, without degrading S/N or causing intermodulation. The ground wave automatic gain control circuit 29 has a second ground wave amplifier circuit 29a, a second ground wave mixing circuit 29b, and a second local oscillator circuit 29c.

Further, the second ground wave amplifier circuit 29a has a volume not shown. The second ground wave amplifier circuit 29a amplifies the signal subjected to the damping processing by the second ground wave filter 28, to a predetermined middle-frequency signal.

Meanwhile, the second ground wave mixing circuit 29b efficiently converts the signal into a middle-frequency signal, to reduce noise. The second local oscillator circuit 29c is a clamp circuit having high stability and adopting a Colpitts oscillator circuit as a base model. The Colpitts oscillator circuit is a stable and simple circuit. Further, the second local oscillator circuit 29c controls the second ground wave mixing circuit 29b such that the middle-frequency is constant.

Further, the ground wave tuner 21 outputs a signal received by the ground wave antenna 17, as a predetermined middle-frequency signals corresponding to the ensemble A or B set by the input portion, to the channel decoder 14.

Meanwhile, the satellite wave tuner 22 has an XM-band pass filter 31, a first satellite wave amplifier circuit 32, a first satellite wave frequency converter circuit 33, a second satellite wave amplifier circuit 34, a second satellite wave filter 35, and a satellite wave automatic gain control circuit 36.

The XM-band pass filter 31 is connected to a satellite wave antenna 18. This XM-band passfilter 31 performs a processing of damping signals having frequencies out of a predetermined frequency band, from signals of electric waves received by the satellite wave antenna 18. For example, in case of receiving the XM digital broadcasting of the digital broadcasting system constructed by the XM satellite radio company, a processing of damping signals out of the XM-band of the XM digital broadcasting is performed.

The first satellite wave amplifier circuit 32 is connected to the XM-band passfilter 31. Used as the first satellite wave amplifier circuit 32 is a high-frequency amplifier transistor which constructs a LNA as an amplifier, e.g., a FET, like the first ground wave amplifier circuit 25. Further, the first satellite wave amplifier circuit 32 outputs the signal subjected to the damping processing by the XM-band pass filter 31, as a high-frequency output signal from a drain.

The first satellite wave frequency converter circuit 33 converts the signal amplified by the first satellite wave amplifier circuit 32, into a predetermined middle-frequency signal. The first satellite wave frequency converter circuit 33 has a first satellite wave mixing circuit 33a and a first local oscillator circuit 26b. Further, the first satellite wave mixing circuit 33a efficiently converts the high-frequency signal outputted from the first satellite wave amplifier circuit 32 into a middle-frequency signal, to reduce noise. The first local oscillator circuit 26b is shared with the first ground wave frequency converter circuit 26, and controls also the first satellite wave mixing circuit 33a such that the middle-frequency is constant. Specifically, the system controller 12 switches and controls the first satellite wave mixing circuit 33a, in correspondence with the ensemble A or B set and inputted by the user, like the first ground wave frequency converter circuit 26.

Used as the second satellite wave amplifier circuit 34 is a high-frequency amplifier transistor which constitutes a LNA as an amplifier, e.g., a FET, like the first satellite wave amplifier circuit 32. Further, the second ground wave amplifier circuit 27 outputs a signal processed by the first ground wave converter circuit 26, as a high-frequency output signal from the drain.

As the second ground wave filter 28, a SAW filter is used for the second satellite wave filter 35. The second satellite wave filter 35 performs a processing of damping signals having frequencies out of the frequency band corresponding to the one of the ensembles A and B that has been set by the input portion. That is, the second satellite wave filter 35 attains either the ensemble A in the frequency band Sat1A or Sat2A or either the ensemble B in the frequency band Sat1B or Sat2B. The frequency bands Sat1A, Sat1B, Sat2A, and Sat2B to be subjected to the damping processing by the second satellite wave filter 35 are set by the system controller 12 in correspondence with the ensemble A or B set by the input portion.

The satellite wave automatic gain control circuit 36 amplifies the signal attained by the second satellite wave filter 35, to a predetermined middle-frequency signal, without degrading S/N or causing intermodulation, like the ground wave automatic gain control circuit 29. The satellite wave automatic gain control circuit 36 has a second satellite wave amplifier circuit 36a, a second satellite wave mixing circuit 36b, and a second local oscillator circuit 29c.

Further, the second satellite wave amplifier circuit 36a has a volume not shown. The second satellite wave amplifier circuit 36a amplifies the signal subjected to the damping processing by the second satellite wave filter 35, to a predetermined middle-frequency signal.

Meanwhile, the second satellite wave mixing circuit 36b efficiently converts the signal into a middle-frequency signal, to reduce noise. The second local oscillator circuit 29c is shared with the ground wave automatic gain control circuit 29, and controls also the second satellite wave mixing circuit 36b, such that the middle-frequency is constant. Specifically, the system controller 12 switches and controls the second satellite wave mixing circuit 36b, in correspondence with the ensemble A or B set and inputted by the user, like the first satellite wave frequency converter circuit 33.

Further, the satellite wave tuner 22 outputs the signal received by the satellite wave antenna 18, as a predetermined middle-frequency signal corresponding to one of the ensembles A and B set by the input portion, to the channel decoder 14.

Meanwhile, the channel decoder 14 has a ground wave demodulator portion 41, a first satellite wave demodulator portion 42, a second satellite wave demodulator portion 43, a demodulation manager portion 44, a deinterleave portion 45, and a system controller interface 46.

The ground wave demodulator portion 41 demodulates a signal outputted from the ground wave tuner 21 of the RF tuner 13. The first satellite wave demodulator portion 42 demodulates a signal outputted from the satellite tuner 22 in correspondence with one of the two artificial satellites 3a and 3b. The second satellite wave demodulator portion 43 demodulates a signal outputted from the other one of the two artificial satellites 3a and 3b.

The demodulation manager portion 44 controls demodulations made by the ground wave demodulator portion 41, the first satellite wave demodulator portion 42, and the second satellite wave demodulator portion 43. Further, the demodulation manager portion 44 attains and appropriately processes signals respectively demodulated by the ground wave demodulator portion 41, the first satellite wave demodulator portion 42, and the second satellite wave demodulator portion 43.

The deinterleave portion 45 deinterleaves the signals attained by the demodulation manager portion 44. That is, electric waves received from the two artificial satellites 3a and 3b adjust a time interleaf of about 4 seconds, which is a time lag due to the positional relationship between the artificial satellites. Further, the deinterleave portion 45 outputs a frame synchronizing pulse and a bit stream, as signals attained by the deinterleave processing. The frame synchronizing pulse and bit stream are encrypted digital signals.

The system controller interface 46 attains control signals from the system controller 12. Further, the system controller interface 46 controls the entire channel decoder 14 including the demodulation manager portion 44, the deinterleave portion 45, and the like, based on the attained control signals.

Meanwhile, the storage 15 is connected to the channel decoder 14, and appropriately stores data of the ensembles A and B, including programs as data processed by the channel decoder 14. Also, the storage 15 outputs the stored data appropriately to the channel decoder 14. Further, the channel decoder 14 appropriately reads data from the storage 15 and operates. The storage 15 is also used for deinterleave processing.

Meanwhile, the source decoder 16 is an integrated circuit such as a DSP (Digital Signal Processor) that processes signals processed by the channel decoder 14 and attains program data. Further, the source decoder 16 has a decoder portion 51, a program selector portion 52, an audio converter portion 53, a BAC (Broadcast Authorization Channel) converter portion 54, and a system controller interface 55.

The decoder portion 51 decodes/processes an encrypted digital signal outputted from the channel decoder 14. For example, the decoder portion 51 expands compressed data. Further, the decoder portion 51 outputs decoded signal to the program selector portion 52.

The program selector portion 52 processes the digital signal decoded by the decoder portion 51 under control from the system controller 12, to attain a signal concerning a predetermined program. The predetermined program is a program set by an input operation from the user or a program switch request for sequentially switching programs.

The audio converter portion 53 attains the signal concerning the predetermined program, which has been attained by the program selector portion 52. The audio converter portion 53 also converts appropriately the signal into a signal of audio data or the like. That is, the audio converter portion 53 outputs the signal as an output signal to an output portion for outputting the program, and appropriately converts the program into the signal for outputting the program as audio.

The BAC converter portion 54 attains and appropriately processes the signal concerning the predetermined program, which has been attained by the program selector portion 52. The processed signal is outputted again to the decoder portion 51.

The system controller interface 55 attains control signals from the system controller 12, like the system controller interface 46 of the channel decoder 14. Further, the system controller interface 55 controls the entire source decoder 16, including the decoder portion 51, program selector portion 52, audio converter portion 53, BAC converter portion 54, and the like based on the attained control signal.

[Operation of Communication System]

Figures 7, 8:
FIG. 7 is an explanatory view showing an operation of attaining programs in the receiver according to the embodiment.
FIG. 8 is an explanatory table showing an operation of attaining programs in the receiver according to the embodiment.
Figure 9:
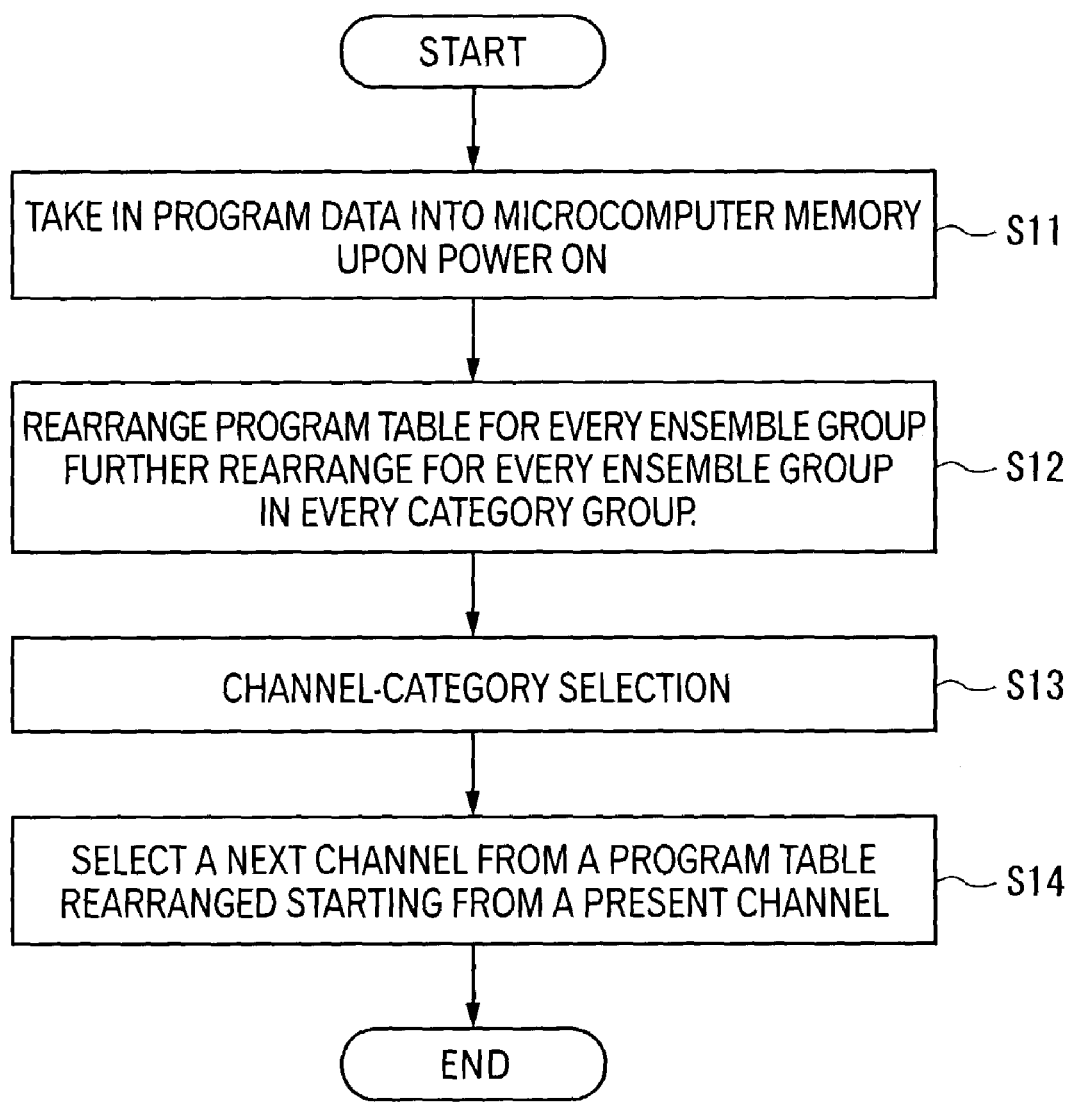
FIG. 9 is a flowchart showing an operation of attaining a program in a channel-category selection manner in the receiver according to the embodiment.
Figures 14, 15:
FIG. 14 is an explanatory view showing an operation of attaining programs in the prior art.
FIG. 15 is an explanatory table showing an operation of attaining programs in the same prior art.

Next, the operation of transmitting/receiving data in the communication system in the embodiment described above will be described with reference to the drawings. FIG. 4 is a flowchart showing an operation of attaining a program by a channel-feed selection in a receiver. FIG. 5 is an explanatory table showing a data configuration of program table data attained by the receiver. FIG. 6 is an explanatory table showing a data configuration of program table data in which data items are rearranged for every ensemble. FIG. 7 is an explanatory view showing an operation attaining a program by the receiver. FIG. 8 is an explanatory table showing an operation of attaining a program by the receiver. FIG. 9 is a flowchart showing the operation of attaining programs by a category channel select in the receiver. FIG. 10 is an explanatory view showing a data structure of program table data attained by the receiver. FIG. 11 is an explanatory view showing an operation of attaining a program by the receiver. FIG. 12 is an explanatory view showing an operation of attaining a program by the receiver.

When the user turns on the power source and the electric power is supplied, the system controller 12 sets the channel 1 included in the ensemble A, which is the first program, i.e., a program table data as a recording list. Further, the system controller 12 receives electric waves outputted from the ground station 2 and artificial satellites 3a and 3b, and makes the RF tuner 13 attain the signal of the channel 1. Further, the system controller 12 makes the channel decoder 14 demodulate the attained signal, to attain program table data of the channel 1, as shown in FIG. 5. When attaining the program table data, the channel decoder 14 performs a deinterleaving processing Further, the program table data thus attained is stored into the microcomputer memory 12a (step S1). The region of the microcomputer memory 12a is constructed in a data configuration in which plural records each including channel data, ensemble data and category data are recorded, corresponding in number to all programs.

Thereafter, as shown in FIG. 6, the system controller 12 performs a processing of rearranging the attained program table data, for every one of groups of equal ensembles A and B based on the ensemble data (step S2). Further, the system controller 12 stores program table data rearranged for every one of equal groups of ensembles A and B into the microcomputer memory 12a.

Further, the system controller 12 determines whether a program switch request for requesting switching of a program from the user has been set or not. Setting the program switch request is based on an input operation on the input portion, such as a selection of a specific program, a channel-feed selection of sequentially shifting programs, or a channel-category selection of sequentially shifting programs in one equal type of category. If the system controller 12 determines that an input of setting a program has not been given, for example, a program stored in the microcomputer memory 12a is set. The program stored in the microcomputer memory 12a is data concerning the last program which had been being set immediately before the power source was turned off.

Alternatively, if the system controller 12 determines that an input of setting a specific program has been given, the program is set. When setting a specific program, data concerning the program is stored into the microcomputer memory 12a.

Further, if it is determined that there has been an input of setting the channel-feed selection, a control of shifting sequentially programs is made (step S3). If the channel-feed selection is set in the step S3, the system controller 12 appropriately processes electric waves to be received and performs a processing of attaining a program next to the program being attained at present (step S4). The next program is a next program listed in the same ensemble A or B as that of the program being attained at present. That is, the next program is set based on the program table data records rearranged for every one of the equal ensembles A and B prepared in the step S2 and shown in FIG. 6.

A more specific description thereof will be made below. The specific description will be made supposing that the channel-feed selection as a program switch request has been set when the channel 2 is attained as a present program, as shown in FIGS. 7 and 8. In the description, programs are supposed to be channels 1 to 10.

If a program switch request for the channel-feed selection is given in the state in which the channel 2 has been attained, the system controller 12 sets the channel 4 as a next program, based on the rearranged program table data shown in FIG. 6. That is, the preceding channel 2 belongs to the ensemble A. Accordingly, the next program in the same ensemble A is the channel 4, from the rearranged program table data shown in FIG. 6. Further, the system controller 12 controls the channel decoder 14, to attain the channel 4. The system controller 12 then appropriately processes the signal of the channel 4 by means of the source decoder 16, and outputs the signal to an output portion, to appropriately output the signal.

Since the change from the channel 2 to the channel 4 is carried out within the same ensemble A, a switching processing need not be made between the ensembles A and B. That is, a processing for receiving the ensemble A was previously made when the channel 1 is attained. Therefore, demodulation processing need not be carried out again by the channel decoder 14.

In this manner, at first, the control of attaining a program listed next in the same ensemble A as the ensemble A of the program which has been previously attained is continued. For example, as shown in FIGS. 7 and 8, programs to be attained are shifted sequentially in the order of 2, 4, 5, 7, 8, and 10. Further, if the system controller 12 further recognizes an input of setting the channel-feed selection, the system controller 12 performs a processing of switching to another ensemble B because the ensemble A does not include a program in the next order. That is, the RF tuner 13 is controlled to attain signals in the frequency band concerning the ensemble B, from the received electric waves. The signals are then subjected appropriately to a deinterleave processing by the channel decoder 14, to attain a signal concerning the ensemble B.

Further, the system controller 12 sets the channel 3 listed first among the rearranged program table data shown in FIG. 6, in the ensemble B thus switched. The channel 3 is appropriately outputted. When the channel-feed selection is thereafter set and inputted, the programs to be attained are sequentially shifted to 6 then to 9, in the ensemble B to which the channel 3 as a preceding program belongs. If the channel-feed selection is further set and inputted, a processing of switching to the other ensemble A is carried out because the ensemble B does not include a program listed next to the channel 9. Further, programs are attained sequentially in the order listed in the ensemble A, from the channel 1 as the program listed first, as has been described previously.

Thus, only in switching to a different ensemble B or A in case of the channel-feed selection, switching between the ensembles A and B is carried out, i.e., the RF tuner 13 switches the first local oscillator circuit 26b, to reattempt the receiving processing. When a program listed next within the same ensemble A or B is attained sequentially, a processing of switching between the ensembles A and B need not be carried out. Therefore, the number of times of switching performed between the ensembles A and B is reduced, as shown in FIG. 8, compared with the case of attaining programs in the order of program table data listed before rearrangement. In addition, the time lag before another program is outputted can be shortened by about four seconds. Utility is thus improved.

If no program is listed next in the program table data in the same ensemble A or B shown in FIG. 6, switching to the other ensemble B or A is carried out. Therefore, even in a state in which the number of times of switching between the ensembles A and B is the least and the time to output a program is shortened, all programs listed on the program table data can be sequentially attained.

Alternatively, if the system controller 12 determines an input of setting the channel-category section, the following procedure is taken based on the operation of the flowchart shown in FIG. 9. As described previously, when the power source is turned on, the program table data is attained at first and stored into the microcomputer memory 12a (step S11). Further, attained program table data are rearranged for every one of equal groups of the ensembles A and B, based on the ensemble data. A processing of further rearranging the program table data for every one of groups of equal categories, for every one of equal groups of ensembles A and B is carried out, to attain program table data shown in FIG. 10 (step S12). The program table data attained by this rearranging processing is stored into the microcomputer memory 12a.

Further, if the system controller 12 determines that an input of setting the channel-category selection, the system controller 12 performs a control of sequentially arranging programs for every one of groups of equal categories, for every one of equal groups of ensembles A and B (step S13). If the channel-category selection is set in the step S13, the system controller 12 appropriately processes electric waves to be received, and performs a processing of attaining a program next to the program being attained at present (in step S14). The next program is a program listed next in the rearranged program table data prepared in the step S12 and shown in FIG. 10.

A specific description thereof will be as follows. As shown in FIGS. 11 and 12, the specific description supposes a case that the channel-category selection has been set as a program switching request, when the channel 2 has been attained as a present program, like the case of the channel-feed selection described above. The description also supposes channels 1 to 10, as shown in FIG. 5.

Further, if a program switch request is given in the state where the channel 2 is attained, the system controller 12 sets the channel 4 as a next program, based on the rearranged program table data shown in FIG. 10. That is, the preceding channel 2 belongs to the category "ROCK" of the ensemble A. Hence, the next program in the same category "ROCK" is the channel 4, based on the rearranged program table data shown in FIG. 10. Further, the system controller 12 controls the channel decoder 14 to attain the channel 4, as well as the source decoder 16 to appropriately process the signal of the channel 4 and output to an output portion. The signal is then outputted appropriately.

In this manner, at first, the control of attaining a program listed next in the same category "ROCK" in the same ensemble A as those of the preceding program is continued. For example, as shown in FIGS. 11 and 12, programs to be attained are shifted sequentially in the order of 2, 4, and 5. If the system controller 12 further recognizes an input of setting the channel-category selection, the system controller 12 performs a processing of switching to the other ensemble B because no program is listed next to the channel 5 in the category "ROCK" in the ensemble A. That is, the RF tuner 13 is controlled to attain signals in the frequency band concerning the ensemble B, from the received electric waves. The signals are then subjected appropriately to a deinterleave processing by the channel decoder 14, to attain a signal concerning the ensemble B.

Further, the system controller 12 sets the channel 3 listed first among the rearranged program table data shown in FIG. 10, in the category "ROCK" in the ensemble B thus switched. The channel 3 is then appropriately outputted.

When the channel-feed selection is thereafter set and inputted sequentially, the programs to be attained are sequentially shifted to the channel 6 in the category "ROCK" in the ensemble B to which the channel 3 as a preceding program belongs. If the channel-feed selection is further set and inputted, a processing of switching to the other ensemble A is carried out as described previously, because the category "ROCK" in the ensemble B does not include any program listed next to the channel 6. Further, programs are attained sequentially in the order listed in the category "ROCK" in the ensemble A, from the channel 2 as the program listed first in the category "ROCK" in the ensemble A, as has been described previously.

Thus, also in the case of the channel-category selection, a processing of switching between the ensembles A and B need not be carried out when a program listed next within the same ensemble A or B is attained. Therefore, the number of times of switching performed between the ensembles A and B is reduced, compared with the case of attaining programs in the order of program table data listed before rearrangement, as shown in FIG. 12. In addition, the time lag before another program is outputted can be shortened by about four seconds. Utility is thus improved.

As described above, a program switching request for sequentially switching programs to be attained, in the order of programs listed in the program table data is set and inputted by an input operation on the input portion. Further, if an input of setting the program switching request by the input portion is recognized by the system controller 12, a next program which is closest to the program which has been attained immediately before the input of setting the program switching request, in the order of the programs listed in the program table data, in the same ensemble A or B as that of the program which has been attained immediately before the input of setting the program switching request. Therefore, in switching to another program, switching to the other ensemble B or A takes place less frequently, so that it is possible to reduce the time lag caused by reattempting a receiving (demodulation) operation due to the processing of switching between the ensembles A and B. Utility can be thus improved.

If the system controller 12 recognizes an input of setting a program switching request and finds no program listed next in the same ensemble A or B, a program listed first in the other ensemble B or A, or a which is closest to the program listed first is attained. Therefore, even in switching to a program in the other ensemble A or B listed in the program table data, the frequency at which switching to the other ensemble B or A takes place can be reduced only by setting a program switching request via the input portion, and programs can be attained sequentially.

Alternatively, if the system controller 12 recognizes an input of setting the category channel section of the program by the input portion, a next program to be attained upon recognition of the program switching request is selected within the range of programs in the same category as that of the program which has been attained immediately before. It is therefore possible to attain easily a favorite program of the user, preventing drawbacks due to the processing of switching between the ensembles A and B.

[Modifications of Embodiments]

The present invention is not limited to the embodiments described above but includes the following medications within a scope in which the objects of the invention can be achieved.

Specifically, the foregoing description has been made with reference to a structure in which the ground station 2 and two artificial satellites 3*a* and 3*b* are used to attain programs divided into two ensembles A and B. The present invention, however, is not limited to this structure but can be achieved by, for example, using plural artificial satellites or dividing plural programs into two or more ensembles. It is further possible to use not only programs but also any data such as image data or the like. That is, the present invention can be achieved by any structure in which at least one ground wave and at least one satellite wave are received to eliminate drawbacks in receiving waves at local areas, plural ensembles each including plural data items are set, and the ensembles are appropriately switched.

Further, the structure of switching the ensembles A and B is not limited to a structure of switching the ensembles by the RF tuner 13 or by the channel decoder 14 but may be any method. For example, it is possible to adopt a structure of attaining a program by a computer in which program software has been installed, the program software to be installed in the computer, and a recording medium in which this program is recorded.

The RF tuner 13, channel decoder 14, and source decoder 16 are not limited to the structures described previously but may have any structures that operate in similar manners.

Although the foregoing description has been made with reference to a structure in which program table data is attained at first and setting of channels is then recognized, received electric waves may be processed on the basis of setting of channels without attaining the program table data. Further, a deinterleave processing can be performed at the time of turning on the power source although a deinterleave processing is carried out after distinguishing the ensembles A and B in the foregoing description. That is, time can be saved if a deinterleave processing is once carried out after turning on the power source. Therefore, the deinterleave processing may be performed at any timing.

In the foregoing description, the structure in which a next program is attained in the same ensemble A or B has been explained such that program table data are grouped and rearranged in advance for every one of types of ensembles A and B or categories, and setting is made based on the rearranged program table data. However, it is possible to adopt any method, for example, in which the system controller 12 searches for a next program in the same ensemble A or B or in the same category, based on the program table data attained at first.

Further, in the foregoing description, programs to be attained are shifted sequentially in the order of 2, 4, 5, 7, 8, and 10, and programs are further sequentially attained after switching to the ensemble B at the time of an input of setting the channel-feed selection. However, the processing may be arranged such that the program returns to, for example, the channel 1 listed first in the same ensemble A or B without switching to the ensemble B. In this case, the time required for the deinterleave processing due to switching between the ensembles A and B can be eliminated, so that time until an output is obtained can be shortened. Conveniences can thus be improved more.

Also, the present invention is not limited to the structure the channel number of the program increases but may adopt the structure in which the programs are attained in the order of 10, 8, 7, 5, 4, and 2.

Like the case of the channel-category selection, the processing may be arranged such that the channel returns to the channel 2 listed first in the same ensemble A or B without switching the ensembles, when attaining a program next to the channel 5 which is the last program in the same category in the same ensemble A or B.

In case of the structure in which switching from the last program returns to the first program within the same ensemble A and B, it is preferred that the ensembles A and B are switched, for example, manually. All programs can be attained by this structure.

In addition, the program switching request is not limited to the structure of an input of directly setting a specific program described above or the channel-feed selection or channel-category selection. Programs may be attained in any other method. For example, programs respectively listed first in categories may be attained sequentially, as shown in FIG. 13, based on program table data rearranged in the order of ensembles for every category, as shown in FIG. 10. More specifically, a processing may be made in the order of the channel 2 in the category "ROCK", the channel 7 in the category "JAZZ", and the channel 10 in the category "POPS".

Furthermore, specific structures in practicing the present invention and procedures for recognizing occurrences of abnormality can be modified into other structures and procedures within the scope in which the objects of the present invention can be achieved.

What is claimed is:

1. A receiver which receives plural aggregates of data in different frequency bands, respectively, from a ground station and plural artificial satellites, in the form of electric waves together with a list of plural different data items which are grouped into the aggregates of data, demodulates the received electric waves to attain predetermined one of the aggregates of data, and attains the data items included in the predetermined one of the aggregate of data, the receiver comprising:

a recording portion which creates a record list based on the list;

an input portion which sets and inputs a data switching request for sequentially switching the attained data items, in an order of the data items listed in the record list, by an input operation; and a control portion which recognizes an input of setting the data switching request by the input portion, and accordingly makes a control of attaining the closest one of the data items to one of the data items which has been attained immediately before the input of setting the data switching request, in the order of the data items listed in the record list, the closet one data item included in the same aggregate of data as one of the aggregates of data which has been attained before the input of setting the data switching request.

2. The receiver according to claim 1, wherein if there is no next data item in the same aggregate of data as the aggregate of data including the one of the data items which has been attained immediately before, when the setting of the data switching request is recognized by the input portion, the control portion makes a control of attaining one of the data items, which is included in another one of the aggregates of data and is listed first in the record list or closest in the order to the one of the data items which has been attained immediately before.

3. The receiver according to claim 1, wherein if there is no next data item in the same aggregate of data as the aggregate of data including the one of the data items which has been attained immediately before, when the input of setting the data switching request is recognized by the input portion, the control portion makes a control of attaining one of the data items, which is included in the same aggregate of data as the one of the data items, which has been attained immediately before, and is listed first in the record list or closest in the order to the one of the data items which has been attained immediately before.

4. The receiver according to claim 1, wherein the input portion is capable of making an input of setting a category of one of the data items to be attained, and the control portion recognizes the input of setting the category by the input portion, and accordingly makes a control of attaining one of the data items in the same category as that of one of the data items which has been attained immediately before, when attaining next one of the data items upon recognition of the data switching request.

5. The receiver according to claim 1, wherein the input portion is capable of making an input of setting one of the data items to be attained, by an input operation, and the control portion makes a control of attaining the one of the data items which is set by the input portion.

6. The receiver according to claim 1, wherein the artificial satellites are two, and the aggregates of data are two.

7. A receiving method in which plural aggregates of data are respectively received in different frequency bands, from a ground station and plural artificial satellites, in the form of electric waves together with a list of plural different data items which are grouped into the aggregates of data, the received electric waves are demodulated to attain predetermined one of the aggregates of data, and the data items included in the predetermined one of the aggregate of data are attained, the receiving method comprising:

creating and recording a record list based on the list; and attaining, if a data switching request for sequentially switching the attained data items in an order of the data items listed in the record list is recognized, the closest one of the data items to one of the data items which has been attained immediately before input of setting the data switching request, in the order of the data items listed in the record list, the closet one data item included in the same aggregate of data as one of the aggregates of data which has been attained before the input of setting the data switching request.

8. The receiving method according to claim 7, wherein if there is no next data item in the same aggregate of data as the aggregate of data including the one of the data items which has been attained immediately before, when an input of setting the data switching request is recognized, one of the data items which is included in another one of the aggregates of data and is listed first in the record list or closest in the order to the one of the data items which has been attained immediately before is attained.

9. The receiving method according to claim 7, wherein if there is no next data item in the same aggregate of data as the aggregate of data including the one of the data items which has been attained immediately before, when an input of setting the data switching request is recognized, one of the data items which is included in the same aggregate of data as one of the data items, which has been attained immediately before, and is listed first in the record list or closest in the order to the one of the data items which has been attained immediately before is attained.

10. The receiving method according to claim 7, wherein if an input of setting a category of the data items is recognized, one of the data items in the same category as that of one of the data items which has been attained immediately before is attained upon recognition of the data switching request.

11. The receiving method according to claim 7, wherein if an input of setting one of the data items to be attained is recognized, one of the data items which is set is attained.

12. The receiving method according to claim 7, wherein two aggregates of data are attained, based on electric waves received from two artificial satellites, and a data item included in one of the aggregates of data is attained.

13. A receiving program which makes a calculator portion to execute the receiving method according to claim 7.

14. A recording medium which records the receiving program according to claim 13, to be readable by the calculator portion.

15. A communication system comprising:

a ground station and plural artificial satellites each of which outputs plural aggregates of data in respectively different frequency bands, in the form of electric waves; and the receiver according to claim 1.

* * * * *